June 5, 1934.  L. C. PARK  1,961,862
GRINDING MACHINE
Filed April 25, 1932
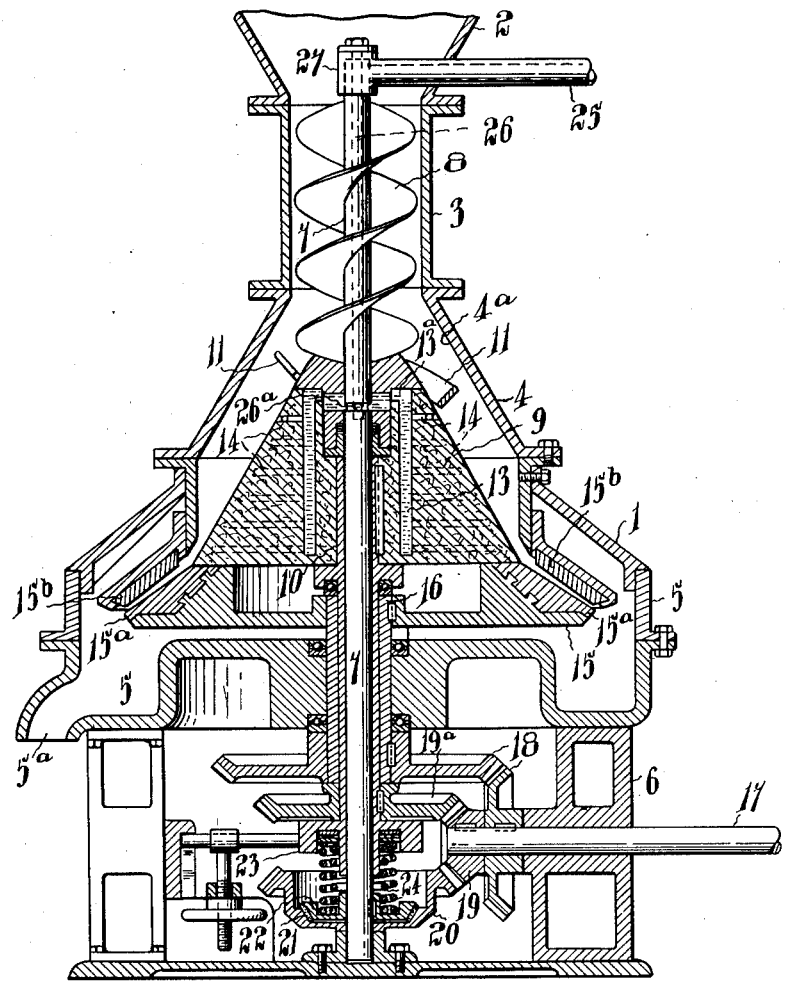
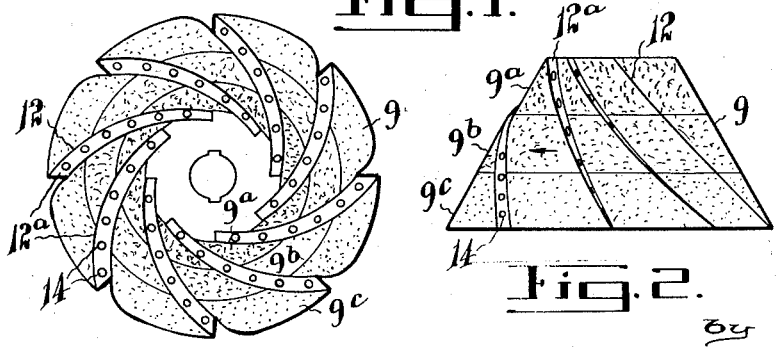
Fig.1.
Fig.2.
Fig.3.
Inventor
L. C. Park
by J. Edw. Maybee
ATTY Patented June 5, 1934

1,961,862

UNITED STATES PATENT OFFICE 1,961,862

GRINDING MACHINE

Louis C. Park, Toronto, Ontario, Canada

Application April 25, 1932, Serial No. 607,381

9 Claims. (Cl. 83—13)

This invention relates to grinding machines and more particularly to that type used for grinding vegetable pulp and my object is to provide a machine of this character which will cheaply, effectively and speedily reduce to pulp all classes of vegetable fibrous substances.

I attain my object by providing a conical grinder mounted to rotate within a casing into which is fed, by means of a screw conveyor, the material to be ground. Vanes carried on the inner side of the casing are so inclined to the direction of rotation of the grinder that the material is fed over the surface thereof which is divided into zones of different degrees of fineness so that the material is ground into finer particles when it reaches successive zones. The pulp discharged from the conical grinder is discharged to a grinder having co-acting rotatable and stationary grinding faces constructed and arranged to grind the pulp to a finer degree.

The constructions are hereinafter more fully described and are illustrated in the accompanying drawing in which Fig. 1 is a longitudinal section of my grinding machine;

Fig. 2 a side elevation of the conical grinder; and

Fig. 3 a plan view thereof.

In the drawing like numerals of reference indicate corresponding parts in the different figures.

1 is a casing comprising a hopper 2, feed tube 3, frusto-conical portion 4, a trough 5 and a base 6. Extending axially of and suitably journalled in the casing is a rotary shaft 7 having a screw conveyor 8 secured thereto which is located within the feed tube 3. The latter communicates with the hopper 2 and with the frusto-conical portion 4 of the casing in which portion is mounted a conical grinder 9 secured to a rotary sleeve 10 disposed on the shaft 7. The material to be ground is fed by the conveyor 8 from the hopper 2 into the casing portion 4, the inner side of which forms a stationary grinding surface 4ª. To prevent the material being ground from turning with the rotary grinder 9, I provide the surface 4ª with a plurality of vanes 11 which are inclined in the direction of rotation of the grinder to feed the material within the portion 4 over the surface of the grinder.

The surface of the grinder 9 is divided into zones 9ª, 9ᵇ and 9ᶜ the first of which is formed of coarse abraiding material, the next medium and the next fine so that the particles of ground pulp will be reduced in size as they travel downwardly over the grinder surface. The surface of the grinder 9 has runways 12 formed therein, each runway comprising a radially directed wall 12ª which is inclined in the direction of rotation of the grinder from the bottom to the top thereof. Within the grinder is formed an annular water chamber 13 and a plurality of passages 14 leading from the chamber to the walls 12ª. The chamber is connected with a source of water supply as hereinafter described and the water is directed from the outlet ends of the passages 14 in the walls 12ª on to the surface of the grinder to wash the ground particles therefrom and to distribute water over the surface of the grinder.

Beneath the conical grinder 9 is located an annular grinder 15 comprising co-acting rotatable and stationary faces 15ª, 15ᵇ adapted to grind the pulp particles discharged thereto from the conical grinder. These faces are separated a greater distance apart at their inlet end than at their discharge end whereby the pulp particles will be further ground to a predetermined fineness before being discharged from the grinder 15. The discharge end of the latter is located above the trough 5 which is adapted to carry the mixture of water and pulp from the grinder 15 through the outlet 5ª of the trough. The rotatable face 15ª is secured to a sleeve 16 disposed on the sleeve 10.

The sleeves 16, 10 and shaft 7 are driven by a drive shaft 17 which may be actuated by any suitable source of power. A pair of bevel gears 18, one being secured to the drive shaft 17 and the other secured to the sleeve 16, forms a driving connection for the latter. A second pair of bevel gears 19, 19ª having the gear 19 secured to the shaft 17 and the gear 19ª to the sleeve 10, drives the latter and thus the conical grinder 9 at a slower rate of speed than that of the sleeve 16 and grinding face 15ª. With the gear 19 is also meshed a gear 20 which is journalled on the shaft 7 and is provided with a clutch face 21 adapted to be engaged by a clutch member 22 secured to the shaft 7. Spring means, comprising an adjustable collar 23 disposed on the shaft 7 and one or more helical springs 24 engaging the collar and the clutch member, tend to maintain the latter in driving engagement with the clutch face 21.

If the pressure against the screw conveyor 8 is sufficient to overcome the pressure of the springs 24, the conveyor, shaft 7 and clutch member 22 will be moved axially to disengage the clutch and thus stop the feeding of more material until such time as the volume of material in the frusto-conical portion 4 is decreased. Any slight variation in the rate of feed of the material to be ground relative to the rate of grinding is thus compensated.

Water is directed to the chamber 13 by a supply pipe 25 having communication with a hole 26 bored longitudinally of the shaft 7 at the upper end thereof. This communication may be established by any well known suitable connection 27 which will permit the shaft to rotate therein. The lower end of the hole 26 communicates by one or more transverse openings 26ª with elongated passages 13ª formed in the grinder 9 and in communication with the chamber 13. The elongated passages maintain communication with the openings 26ª when the shaft 7 is moved axially.

With my machine many kinds of otherwise waste material may be ground for use in making insulating boards and other subsidiary products of pulp and paper mills. Any suitable means may be employed to adjustably carry the stationary face 15ᵇ so that it may be moved relative to its co-acting rotary face 15ª to suit different kinds of material and to take up any wear.

What I claim as my invention is:

1. A grinding machine comprising a shaft; a driven sleeve disposed on said shaft; a second driven sleeve disposed on the first sleeve; a rotary conical grinding member secured to the first sleeve; a stationary grinding member adapted to cooperate with said conical grinding member; a rotary grinding member secured to the second sleeve; a stationary grinding member adapted to co-operate with the second mentioned grinding member for grinding the ground material discharged thereto from the conical grinding member; means secured to the shaft for feeding material to the conical grinding member; a drive shaft; separate means for driving each sleeve from the drive shaft; and a disengageable driving connection between the drive shaft and the first mentioned shaft whereby the feeding means may stop independently of the rotary grinding members.

2. A grinding machine comprising a shaft; a driven sleeve disposed on said shaft; a second driven sleeve disposed on the first sleeve; a rotary conical grinding member secured to the first sleeve; a stationary grinding member adapted to cooperate with said conical grinding member; a rotary grinding member secured to the second sleeve; a stationary grinding member adapted to co-operate with the second mentioned grinding member for grinding the ground material discharged thereto from the conical grinding member; means secured to the shaft for feeding material to the conical grinding member; separate means for driving each of the sleeves; a friction clutch driving connection between one of the driving means and the shaft; and spring means for normally retaining the clutch in its engaged position.

3. A grinding machine comprising a shaft; a driven sleeve disposed on said shaft; a second driven sleeve disposed on the first sleeve; a rotary conical grinding member secured to the first sleeve; a stationary grinding member adapted to co-operate with said conical grinding member; a rotary grinding member secured to the second sleeve; a stationary grinding member adapted to co-operate with the second mentioned grinding member for grinding the ground material discharged thereto from the conical grinding member; means secured to the shaft for feeding material to the conical grinding member; separate means for driving each of the sleeves; a friction clutch driving connection between one of the driving means and the shaft; spring means for normally retaining the clutch in its engaged position; and means for adjusting the spring means to vary the pressure on the clutch driving connection.

4. A grinding machine including a stationary grinding member; a rotary conical grinding member adapted to co-operate with the stationary grinding member and having inclined runways formed in its grinding surface for the exit of ground material therefrom, each of the said runways including a radially directed wall inclined in the direction of rotation of the rotary grinding member from the bottom to the top thereof, the said walls being directed rearwardly relative to the direction of rotation; and means for directing jets of water rearwardly over the surface of the grinder from the radially directed walls.

5. A grinding machine comprising a driven sleeve; a shaft axially movable within said sleeve; a stationary grinding member; a rotary grinding member secured to the sleeve and adapted to co-operate with the stationary grinding member; a conveyor secured to the shaft for feeding material to be ground to the grinding members; means for driving said sleeve; a clutch driving connection between the driving means and the shaft, the clutch including a driven member secured to the shaft and a driving member connected with the driving means; and spring means for moving the shaft axially to engage the driven and driving members and normally maintain them in engagement.

6. A grinding machine comprising a driven shaft; a driven sleeve disposed on said shaft; a rotary grinding member secured to the sleeve; a stationary grinding member adapted to co-operate with the rotary grinding member to grind material between them; means secured to the shaft for feeding material to the grinding members; a drive shaft; gearing for driving the sleeve from the drive shaft; a clutch member journalled on the driven shaft and driven by the gearing; a clutch member secured to the driven shaft and adapted to engage the first clutch member to cause the driven shaft and the feeding means to be driven; and spring means for normally retaining the second mentioned clutch member in engagement with the first mentioned clutch member.

7. A grinding machine comprising a stationary grinding member; a rotary grinding member adapted to co-operate with the stationary grinding member; a driven shaft axially movable within said rotary grinding member; a screw conveyor secured to the shaft for feeding material to be ground to the grinding members; a drive shaft; means for driving the rotary grinding member from the drive shaft; a disengageable driving connection between the drive shaft and the driven shaft; and means tending to move the driven shaft axially to engage the driving connection, the said connection being disengaged by an axial movement of the driven shaft in the reverse direction.

8. A grinding machine comprising a stationary grinding member; a rotary grinding member adapted to co-operate with the stationary grinding member; a driven shaft axially movable within said rotary grinding member; a screw conveyor secured to the driven shaft for feeding material to be ground to the grinding members; a drive shaft; means for driving the rotary grinding member from the drive shaft; means including a clutch for driving the conveyor from the drive shaft, the clutch including driven and driving members, the driven member being secured to the driven shaft and axially movable therewith relative to the driving member; and means for moving the driven shaft axially to engage the driven and driving members and normally maintain them in engagement.

9. A grinding machine comprising a stationary grinding member; a rotary grinding member adapted to co-operate with the stationary grinding member; a driven shaft axially movable within said rotary grinding member; a screw conveyor secured to the driven shaft for feeding material to be ground to the grinding members; a drive shaft; gearing between the drive shaft and the rotary grinding member for driving the latter; and a clutch comprising driving and driven members, the driving member being geared to said gearing, the driven member being secured to the driven shaft and axially movable therewith relative to the driving member; and means for moving the driven shaft axially to engage the driven and driving members and normally maintain them in engagement.

LOUIS C. PARK.